(12) United States Patent
Yamazaki

(10) Patent No.: US 9,933,510 B2
(45) Date of Patent: Apr. 3, 2018

(54) SAFETY SCANNER AND OPTICAL SAFETY SYSTEM

(71) Applicant: Keyence Corporation, Osaka (JP)

(72) Inventor: Kentaro Yamazaki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/410,794

(22) Filed: Jan. 20, 2017

(65) Prior Publication Data

US 2017/0242099 A1 Aug. 24, 2017

(30) Foreign Application Priority Data

Feb. 22, 2016 (JP) ................................. 2016-031509

(51) Int. Cl.
| | | |
|---|---|---|
| *G01B 11/14* | (2006.01) | |
| *G01S 7/48* | (2006.01) | |
| *G01S 7/481* | (2006.01) | |
| *G01S 17/42* | (2006.01) | |
| *G08B 13/24* | (2006.01) | |

(52) U.S. Cl.
CPC .......... *G01S 7/4808* (2013.01); *G01S 7/4817* (2013.01); *G01S 17/42* (2013.01); *G08B 13/2491* (2013.01)

(58) Field of Classification Search
CPC ....... G01B 11/00; G01B 11/02; G01B 11/024; G01B 11/26; H05K 13/0413
USPC ......................................................... 356/615
See application file for complete search history.

(56) References Cited

U.S. PATENT DOCUMENTS

| | | | |
|---|---|---|---|
| 6,616,044 B1 * | 9/2003 | Gu ...................... | G06K 7/10584 235/462.14 |
| 7,598,484 B2 | 10/2009 | Yamaguchi | |
| 8,063,780 B2 | 11/2011 | Onishi | |
| 8,069,007 B2 | 11/2011 | Oh | |
| 8,248,235 B2 | 8/2012 | Inoue et al. | |
| 8,319,171 B2 | 11/2012 | Kawabata | |
| 8,330,095 B2 | 12/2012 | Kawabata | |
| 8,415,609 B2 | 4/2013 | Kawabata et al. | |
| 8,648,292 B2 | 2/2014 | Kawabata et al. | |
| 2003/0179350 A1 * | 9/2003 | Hecht ................ | G06K 7/10584 353/122 |
| 2008/0158555 A1 * | 7/2008 | Mori ...................... | G01S 7/481 356/239.2 |
| 2009/0283666 A1 | 11/2009 | Tagashira | |
| 2009/0295577 A1 | 12/2009 | Yamaguchi | |

(Continued)

*Primary Examiner* — Tarifur Chowdhury
*Assistant Examiner* — Md M Rahman
(74) *Attorney, Agent, or Firm* — Kilyk & Bowersox, P.L.L.C.

(57) ABSTRACT

Provided is a safety scanner capable of easily grasping the correspondence relationship between a distance measurement position on a scanning plane and a real space. The safety scanner includes a distance measurement section that obtains distance measurement information corresponding to a distance optically sensed and a scanning angle of a detection light, an intrusion sensing section that senses an intruder within the protection area on the basis of the distance measurement information and a area designation information, a marker identification section that identifies a marker movably disposed within the detection area, and the distance measurement information of the marker as an area generation information for determining the protection area.

10 Claims, 10 Drawing Sheets

(56) References Cited

U.S. PATENT DOCUMENTS

| | | | |
|---|---|---|---|
| 2010/0149330 A1* | 6/2010 | Salgar | G08B 13/19686 348/143 |
| 2015/0369618 A1* | 12/2015 | Barnard | H05B 37/0272 701/491 |
| 2016/0155306 A1 | 6/2016 | Kawanaka et al. | |
| 2016/0163171 A1 | 6/2016 | Yamazaki et al. | |
| 2017/0242101 A1 | 8/2017 | Oh | |
| 2017/0242110 A1 | 8/2017 | Tomoshi et al. | |
| 2017/0242111 A1 | 8/2017 | Tagashira et al. | |
| 2017/0242123 A1 | 8/2017 | Yamazaki et al. | |

* cited by examiner

SAFETY SCANNER AND OPTICAL SAFETY SYSTEM

CROSS-REFERENCE TO RELATED APPLICATIONS

The present application claims foreign priority based on Japanese Patent Application No. 2016-031509, filed Feb. 22, 2016, the contents of which is incorporated herein by reference.

BACKGROUND OF THE INVENTION

1. Field of the Invention

The present invention relates to a safety scanner and an optical safety system and, more particularly, to an improvement of a safety scanner and an optical safety system that receive reflected light from an object within a detection area to sense an intruder within a protection area.

2. Description of Related Art

An optical safety sensor is an area monitoring device which optically senses an intruder such as a person intruded into a protection area and outputs a safety control signal for emergently stopping a machine tool or an industrial robot (e.g., JP 2009-296087 A and JP 2009-294734 A).

For example, a safety scanner is an optical scanning area monitoring device provided with a light emitting part which emits detection light toward an object, a light receiving part which receives reflected light from the object and generates a light receiving signal, a distance calculation part which obtains a distance to the object on the basis of the light receiving signal, and a scanning part which causes the detection light to perform scanning in the circumferential direction around a rotation axis. Sensing of an intruder is performed by identifying the position of an object from the distance to the object and a scanning angle of the detection light and checking the identified position against a protection area.

Setting data which includes area designation information designating a protection area and measurement setting information designating a measurement condition are created using a setting support device. There is a conventional optical safety system that displays distance measurement information corresponding to the distance and the scanning angle on a screen as a scan image. The scan image is formed by two-dimensionally displaying a plurality of distance measurement information items obtained by performing scanning with detection light, and each of the distance measurement information items is indicated as a distance measurement position on a scanning plane of the detection light. Many distance measurement information items can be promptly grasped by displaying such a scan image.

However, it is not easy to grasp the correspondence relationship between the scan image and a real space, and it is not easy to grasp what in the real space a distance measurement position displayed on the scan image corresponds to. Even when the protection area is designated on such a scan image, it is difficult to determine whether or not the protection area is correctly designated at a desired position in the real space. Thus, for example, a conventional optical safety system requires an operation of actually checking whether or not an intruder is appropriately sensed after transferring setting data to the safety scanner, which disadvantageously makes an operation of creating setting data complicated.

SUMMARY OF THE INVENTION

The present invention has been made in view of the above circumstances, and an object thereof is to provide a safety scanner and an optical safety system capable of easily grasping the correspondence relationship between a distance measurement position on a scanning plane and a real space.

According to one embodiment of the invention, a safety scanner includes a light emitting section that emits detection light to a detection area; a light receiving section that receives reflected light from an object within the detection area and generates a light receiving signal; a distance calculation section that obtains a distance to the object on the basis of the light receiving signal; a scanning section that causes the detection light to perform scanning in a circumferential direction around a rotation axis; a distance measurement section that obtains distance measurement information corresponding to the distance and a scanning angle of the detection light; an area designation information receiving section that receives area designation information designating a protection area within the detection area from a setting support device; an intrusion sensing section that senses an intruder within the protection area on the basis of the distance measurement information and the area designation information; a marker identification section that identifies a marker movably disposed within the detection area; and an area generation information transmission section that transmits distance measurement information of the marker to the setting support device as area generation information for determining the protection area.

According to such a configuration, the marker within the detection area is identified, and distance measurement information thereof is transmitted to the setting support device. Thus, a distance measurement position of the marker can be displayed on the screen in the setting support device. For example, by displaying the distance measurement position of the marker on the scanning plane of the detection light, the correspondence relationship between the distance measurement position on a scanning plane and the real space can be easily grasped from the position of the marker in the detection area. Further, the area designation information can be automatically generated using the distance measurement information of the marker in the setting support device.

According to another embodiment of the invention, in the safety scanner, in addition to the above configuration, the marker identification section identifies the marker on the basis of a receiving amount of the reflected light. According to such a configuration, an object having high light reflectance or a light emitter can be used as the marker.

According to still another embodiment of the invention, in the safety scanner, in addition to the above configuration, the marker identification section identifies the marker on the basis of a shape of a reflecting surface that reflects the detection light. According to such a configuration, an object whose reflecting surface reflecting the detection light has a predetermined shape can be used as the marker.

According to still another embodiment of the invention, in the safety scanner, in addition to the above configuration, the marker identification section identifies the marker on the basis of a polarization component of the reflected light. According to such a configuration, an object having an imbalance in polarization components of reflected light can be used as the marker.

According to still another embodiment of the invention, in the safety scanner, in addition to the above configuration, the marker identification section identifies a movable body as the marker on the basis of a stop time of the movable body that is temporarily stopped, and the area generation information transmission section transmits distance measurement information of the marker in a temporarily stopped state.

According to such a configuration, the distance measurement information of the marker can be automatically transmitted to the setting support device merely by temporarily stopping the marker. Further, an operation of creating setting data can be simplified by designating the protection area using such distance measurement information.

According to still another embodiment of the invention, in addition to the above configuration, the safety scanner further includes a capture signal receiving section that receives a capture signal, and the area generation information transmission section transmits distance measurement information of the marker in accordance with the capture signal. According to such a configuration, the distance measurement information of the marker is transmitted to the setting support device merely by transmitting the capture signal. Thus, an operation of creating setting data can be simplified.

According to one embodiment of the invention, an optical safety system includes a light emitting section that emits detection light to a detection area; a light receiving section that receives reflected light from an object within the detection area and generates a light receiving signal; a distance calculation section that obtains a distance to the object on the basis of the light receiving signal; a scanning section that causes the detection light to perform scanning in a circumferential direction around a rotation axis; a distance measurement section that obtains distance measurement information corresponding to the distance and a scanning angle of the detection light; an area designation information generation section that generates area designation information designating a protection area within the detection area; an intrusion sensing section that senses an intruder within the protection area on the basis of the distance measurement information and the area designation information; a marker identification section that identifies a marker movably disposed within the detection area; and an area generation information display section that displays a scanning plane of the detection light on a screen and displays a distance measurement position corresponding to distance measurement information of the marker on the scanning plane, and the area designation information generation section generates the area designation information on the basis of distance measurement information of the marker.

According to such a configuration, the marker within the detection area is identified, and the distance measurement information thereof is displayed on the scanning plane. Thus, the correspondence relationship between the distance measurement position on the scanning plane and the real space can be easily grasped from the position of the marker in the detection area. Further, the area designation information is automatically generated using the distance measurement information of the marker. Thus, an operation of creating setting data can be simplified.

According to another embodiment of the invention, in the optical safety system, in addition to the above configuration, the area generation information display section displays, as a boundary of the protection area, a polygonal line that chronologically connects two or more distance measurement positions that are sequentially acquired as distance measurement information of the marker on the scanning plane.

According to such a configuration, a polygonal line that chronologically connects the distance measurement positions of the marker is displayed on the scanning plane by moving the marker along the outer edge of the area. Thus, the boundary of the protection area can be easily identified from the polygonal line.

According to still another embodiment of the invention, in the optical safety system, in addition to the above configuration, the area designation information generation section generates the area designation information that also designates a warning area within the detection area on the basis of distance measurement information of the marker, and the intrusion sensing section outputs a safety control signal for emergently stopping a machine when sensing an intruder within the protection area and performs user notification when sensing an intruder within the warning area. According to such a configuration, the warning area is automatically designated by moving the marker. Thus, an operation of creating setting data including the warning area can be simplified.

According to still another embodiment of the invention, in addition to the above configuration, the optical safety system further includes an imaging section that captures an image of the detection area to generate a camera image, and the area generation information display section displays the camera image on the screen and displays a distance measurement position corresponding to distance measurement information of the marker on the camera image.

According to such a configuration, a state of the protection area and the periphery thereof can be checked using the camera image. Further, the distance measurement position of the marker is displayed on the camera image. Thus, the correspondence relationship between the distance measurement position on the scanning plane and the real space can be easily grasped from the camera image.

According to the present invention, it is possible to provide a safety scanner and an optical safety system capable of easily grasping the correspondence relationship between a distance measurement position on a scanning plane of detection light and a real space from the position of a marker in a detection area by displaying the distance measurement position of the marker on the scanning plane.

DETAILED DESCRIPTION OF PREFERRED EMBODIMENT

First, a schematic configuration of an optical safety system as a premise of the present invention will be described below with reference to FIGS. 1 and 2.

<Optical Safety System 1>

Figure 1:
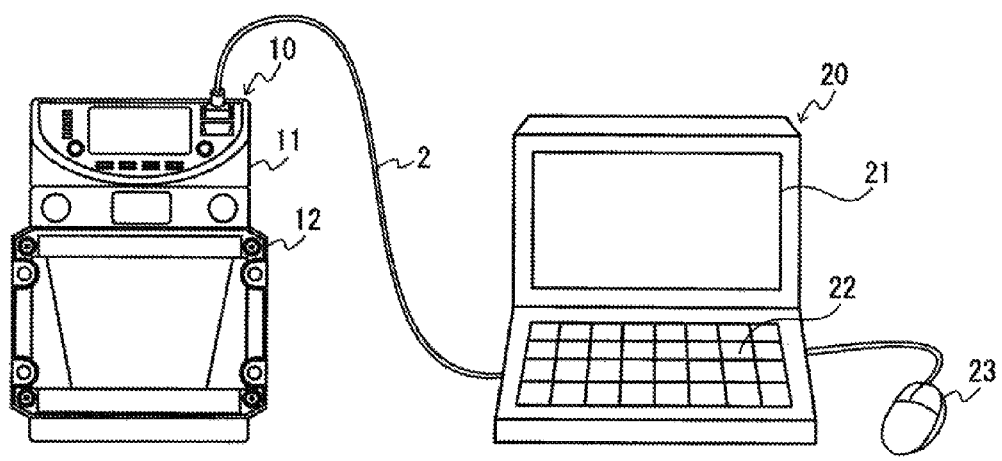
FIG. 1 is a system diagram illustrating a configuration example of an optical safety system according to an embodiment of the present invention.

FIG. 1 is a system diagram illustrating a configuration example of an optical safety system 1 according to an embodiment of the present invention. The optical safety system 1 includes the safety scanner 10 which senses an intruder within a protection area and outputs a sensing signal, and a setting support device 20 which generates setting data for the safety scanner. The safety scanner 10 and the setting support device 20 are connected to each other through a communication cable 2.

The sensing signal is a safety control signal for emergently stopping a machine such as a machine tool or an industrial robot. The sensing signal is output to a safety control device (not illustrated) which controls the machine, for example, to a programmable logic controller (PLC). The operation of a machine as a control target of the safety control device can be stopped by switching an output state of the sensing signal to an off state.

The protection area is a monitoring target area of intruder sensing. For example, an area around machinery and equipment such as a work area of a machine tool or an industrial robot or a moving area of a conveyance vehicle is designated as the protection area.

The safety scanner 10 is an optical scanning safety sensor which optically senses an intruder within the protection area, and includes a display unit 11 and a measurement unit 12. The display unit 11 is a user interface which receives a user operation and displays, for example, an operating state and setting data and provided with a connection port for the communication cable 2 and an output port for a safety control signal.

The measurement unit 12 is a sensor head unit which emits detection light to a detection area and receives reflected light from an object within the detection area to sense an intruder. The detection area is the largest area detectable by the measurement unit 12. The protection area is an area designated within the detection area. The measurement unit 12 is provided with a rotary optical system which causes detection light to perform scanning in the circumferential direction around a rotation axis and a camera which captures an image of the detection area to generate a camera image.

A warning area can be set to the safety scanner 10 in addition to the protection area. When the safety scanner 10 senses an intruder within the warning area, the safety scanner 10 outputs an auxiliary output signal and performs user notification by, for example, lighting an indicator lamp.

For example, the measurement unit 12 is placed on a horizontal floor surface. The display unit 11 includes an output signal switching device (OSSD). When no intruder is present within the protection area, the OSSD is in an on state, and a sensing signal of an on state is output. On the other hand, when an intruder is present within the protection area, the OSSD is in an off state, and a sensing signal of an off state is output.

The setting support device 20 is an information processing terminal, for example, a personal computer which is provided with a display 21, a keyboard 22, and a mouse 23. For example, the setting support device 20 creates setting data for designating the protection area and a measurement condition. The setting data includes area designation information for designating the protection area and measurement setting information for designating the measurement condition. Further, the setting support device 20 performs an operation of acquiring distance measurement information and a camera image from the safety scanner 10 and displaying the acquired information and image on the display 21.

For example, the setting support device 20 can be achieved by operating a computer in accordance with a setting support program for the safety scanner. Such a setting support program is recorded in a computer readable recording medium such as a CO-ROM to be provided or provided through a network.

<Safety Scanner 10>

Figure 2:
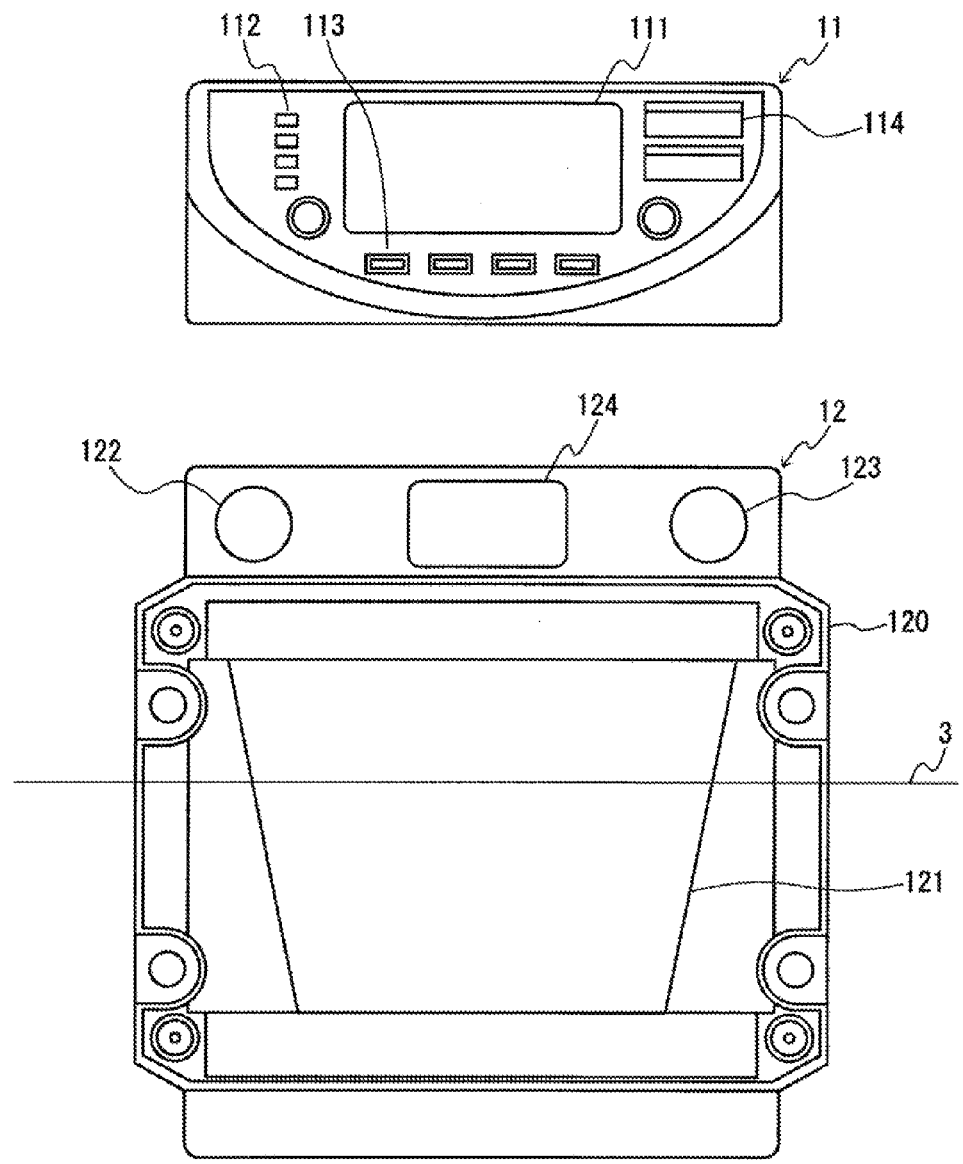
FIG. 2 is a diagram illustrating a configuration example of a safety scanner of FIG. 1.

FIG. 2 is a diagram illustrating a configuration example of the safety scanner 10 of FIG. 1 and illustrates a separate type safety sensor which includes the display unit 11 separable from the measurement unit 12. FIG. 2 illustrates the safety scanner 10 viewed from the front side. The display unit 11 and the measurement unit 12 are connected to each other through a wiring cable (not illustrated). Two or more measurement units 12 can be connected to the display unit 11 at the same time.

A scanner casing 120 of the measurement unit 12 houses the rotary optical system which emits detection light in the horizontal direction and causes the detection light to perform scanning along a horizontal scanning plane 3, and a protective cover 121 for protecting the rotary optical system is attached to a housing part for the rotary optical system. The scanning plane 3 is a plane perpendicular to the rotation axis of the rotary optical system.

For example, laser light having a wavelength in an infrared range is used as the detection light. The detection light repeatedly performs scanning at a constant scanning period. The scanner casing 120 is provided with two fixed cameras 122 and 123, and an indicator 124 which indicates an output state of the sensing signal. The fixed cameras 122, 123 and the indicator 124 are disposed above the housing part for the rotary optical system.

Both the fixed cameras 122 and 123 are imaging devices which capture an image of the detection area to generate a camera image and disposed with different orientations. The fixed camera 122 is disposed on the left side with respect to the indicator 124 when viewed from the side facing the measurement unit 12. On the other hand, the fixed camera 123 is disposed on the right side with respect to the indicator 124 when viewed from the side facing the measurement unit 12. That is, the fixed cameras 122 and 123 are disposed at different positions in the circumferential direction with respect to the rotation axis of the rotary optical system. The fixed camera 122 is a camera whose angle of view includes a right side area with respect to the front-rear direction viewed from the measurement unit 12, and the fixed camera 123 is a camera whose angle of view includes a left side area with respect to the front-rear direction viewed from the measurement unit 12. The fixed cameras 122 and 123 are disposed above the scanning plane 3 and thus capable of obtaining a camera image of a bird's eye view of the scanning plane 3.

The fixed cameras 122 and 123 preferably capture not only an image of the protection area, but also an image of the periphery of the protection area. More preferably, the fixed cameras 122 and 123 capture images of an area settable as the warning area and the periphery thereof.

The indicator 124 is an indicator lamp which indicates an output state and an operating state of the sensing signal. The indicator 124 is lit in different colors according to the output state of the sensing signal. For example, the indicator 124 is lit in red when the OSSD is in an off state and lit in green when the OSSD is in an on state.

The display unit 11 is disposed on the upper face of the measurement unit 12. The display unit 11 is provided with a display panel 111, an indicator 112, an operation key 113, and a cable connection port 114.

The display panel 111 is a display device which screen-displays, for example, an operating state, distance measurement information, a camera image, and setting data. For example, the display panel 111 is a liquid crystal display (LCD) panel. The indicator 112 is an indicator lamp for indicating, for example, an operating state and an output state of the sensing signal. The cable connection port 114 is an input/output terminal part to which the communication cable 2 is detachably connected. The display unit 11 communicates with the measurement unit 12 and is capable of checking the protection area and a sensing history of an intruder even when placed at a position away from the measurement unit 12.

Next, a more detailed configuration of the optical safety system 1 according to the present invention will be described below with reference to FIGS. 3 to 10.

<Measurement Unit 12>

Figure 3:
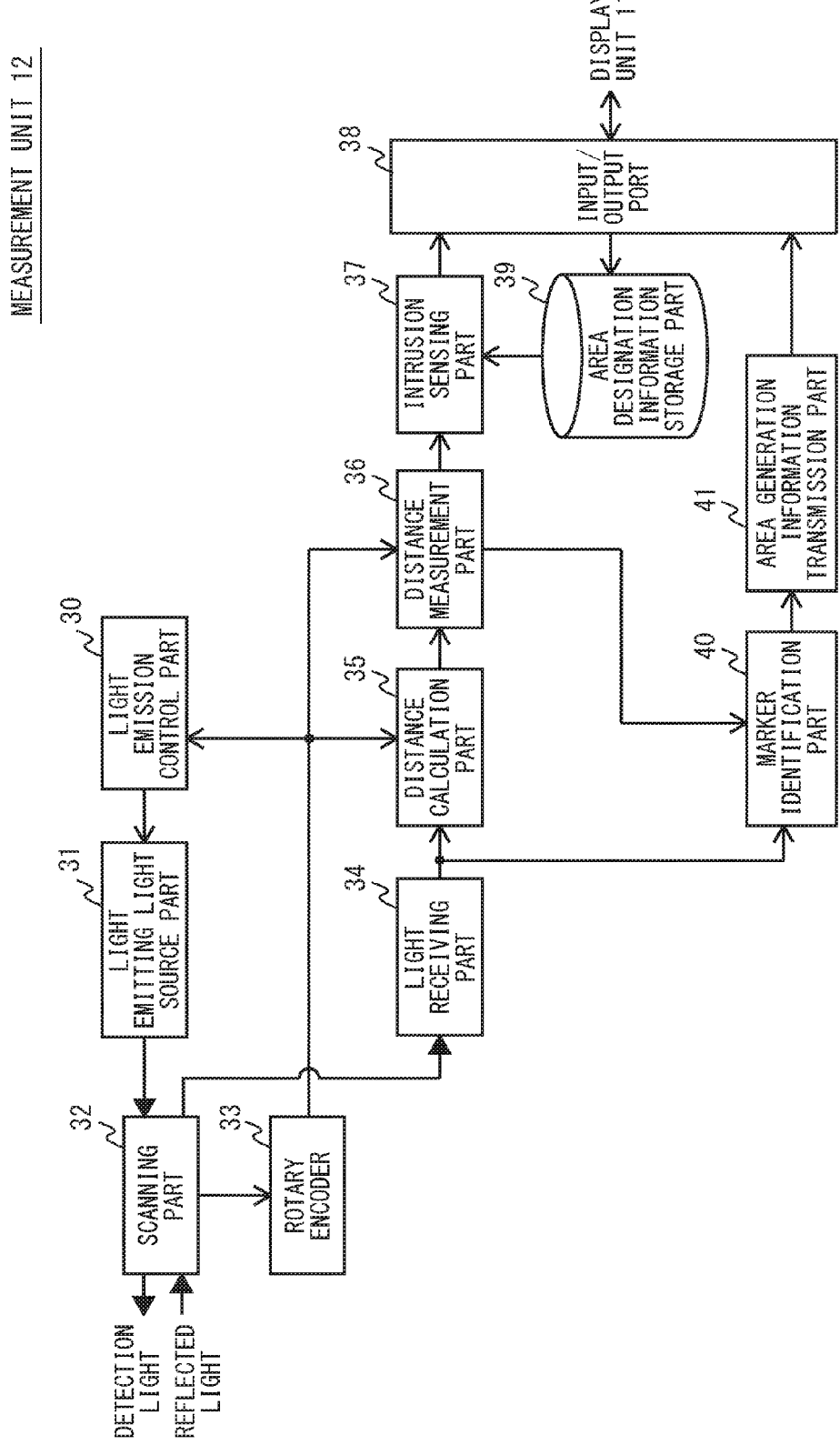
FIG. 3 is a block diagram illustrating an example of a functional configuration in a measurement unit of FIG. 2.

FIG. 3 is a block diagram illustrating an example of a functional configuration in the measurement unit 12 of FIG. 2. The measurement unit 12 includes a light emission control part 30, a light emitting light source part 31, a scanning part 32, a rotary encoder 33, a light receiving part 34, a distance calculation part 35, a distance measurement part 36, an intrusion sensing part 37, an input/output port 38, an area designation information storage part 39, a marker identification part 40, and an area generation information transmission part 41.

The light emitting light source part 31 includes a light emitting element such as a laser diode (LD) or a light emitting diode (LED) and generates detection light. The light emission control part 30 controls the light emitting light source part 31 so that the light emitting light source part 31 generates pulse-like detection light at a constant time interval. The scanning part 32 includes the rotary optical system which emits the detection light toward an object and causes the detection light to perform scanning in the circumferential direction around the rotation axis and a drive part which rotates the rotary optical system around the rotation axis. For example, the rotary optical system of the scanning part 32 includes an emitter mirror which reflects the detection light toward an object, a receiver lens which receives reflected light from the object, and a receiver mirror which reflects the reflected light transmitted through the receiver lens toward a light receiving element.

The light receiving part 34 includes a light receiving element such as a photodiode (PD), and receives reflected light from an object and generates a light receiving signal. The rotary encoder 33 is a rotation detection device which detects a rotation of the rotary optical system and generates a pulse signal whose pulse repetition interval corresponds to a rotation speed. The light emission control part 30 controls the light emitting light source part 31 on the basis of the pulse signal of the rotary encoder 33 to adjust an emission timing of the detection light. For example, every time the rotary optical system of the scanning part 32 rotates by 360/1000°, the detection light is emitted.

The distance calculation part 35 obtains a distance to the object on the basis of the light receiving signal from the light receiving part 34. The distance calculation part 35 is a measurement part which performs distance measurement by a time of flight (TOF) system. The distance calculation part 35 measures a receiving timing of the light receiving signal on the basis of the timing of the pulse signal of the rotary encoder 33 and identifies a delay time between when detection light is emitted and when reflected light corresponding to the detection light is received to calculate the distance to the object as a detection distance. The distance measurement part 36 obtains distance measurement information corresponding to the detection distance obtained by the distance calculation part 35 and a scanning angle of the detection light.

The intrusion sensing part 37 senses an intruder within the protection area on the basis of the distance measurement information of the distance measurement part 36 and outputs a sensing signal. The scanning angle of the detection light is identified on the basis of the pulse signal of the rotary encoder 33. Further, whether or not an intruder is present within the protection area is determined by identifying a two-dimensional position of the intruder from the detection distance and the scanning angle of the detection light and checking the identified two-dimensional position against positional information of the protection area. The sensing signal is transmitted to the display unit 11 through the input/output port 38.

Further, the intrusion sensing part 37 senses an intruder within the warning area on the basis of the distance measurement information of the distance measurement part 36. When sensing an intruder within the warning area, the intrusion sensing part 37 performs user notification. The warning area is an area to be a monitoring target of intruder sensing and designated within the detection area. The user notification is performed, for example, by lighting the indicator 112 in an indication mode different from the case when an intruder within the protection area has been sensed.

The input/output port 38 is a communication interface part which communicates with the display unit 11, and receives setting data from the display unit 11 and transmits an operating state, distance measurement information, a sensing signal, a scan image, and a camera image to the display unit 11. The area designation information storage part 39 holds area designation information which designates the protection area. The area designation information includes positional information indicating the two-dimensional position of the protection area, and is acquired from the display unit 11 through the input/output port 38.

The scan image is formed by two-dimensionally displaying a plurality of distance measurement information items obtained within a scanning period of the detection light. Each of the distance measurement information items is represented as a distance measurement position on the scanning plane 3 identified by the scanning angle and the detection distance. The scanning plane 3 is a plane perpendicular to the rotation axis of the rotary optical system of the scanning part 32. For example, the scan image is a moving image which is created on the basis of distance measurement information which is acquired when the reflected light is received, and updated synchronously with the scanning period of the detection light.

The marker identification part 40 identifies a marker which is movably disposed within the detection area, and outputs the identification result to the area generation information transmission part 41. The marker is a position designation object which is disposed within the detection area for designating the protection area. The marker identification part 40 identifies a receiving amount of reflected light from a light receiving signal of the light receiving part 34, and identifies the marker on the basis of the light receiving amount.

For example, the receiving amount of the reflected light is compared with a light amount threshold for determination, and the marker is identified according to the comparison result. Such a configuration enables an object having high light reflectance or a light emitter to be used as the marker.

Further, the marker identification part 40 detects a movable body on the basis of distance measurement information which is updated synchronously with the scanning period of the detection light, and identifies the movable body as a marker on the basis of a stop time of the movable body which is temporarily stopped. The movable body is detected by comparing a plurality of distance measurement information items having different scanning periods.

For example, the stop time of the movable body is compared with a time threshold for determination, and whether or not the movable body is a marker is determined on the basis of the comparison result. Such a configuration makes it possible to automatically transmit distance measurement information of the marker to the setting support device 20 merely by temporarily stopping the marker.

The area generation information transmission part 41 transmits distance measurement information of the marker to the setting support device 20 as area generation information for determining the protection area. For example, the area generation information transmission part 41 transmits distance measurement information of the marker in a temporarily stopped state. The area generation information including the distance measurement information of the marker is transmitted to the display unit 11 through the input/output port 38.

Note that the measurement unit 12 may further include a capture signal receiving section which receives a capture signal for capturing distance measurement information of the marker, and the area generation information transmission part 41 may transmit the distance measurement information of the marker to the setting support device 20 in accordance with the capture signal. For example, the capture signal is a trigger signal which is transmitted from the display unit 11 in accordance with an operation of the operation key 113 and received through the input/output port 38. Alternatively, the capture signal is transmitted from a wireless device such as a cellular phone.

Distance measurement information of the marker acquired immediately after the reception of the capture signal or distance measurement information of the marker acquired immediately before the reception is captured as area generation information. With such a configuration, the distance measurement information of the marker is transmitted to the setting support device 20 merely by transmitting the capture signal. Thus, an operation of creating setting data can be simplified.

Although there is described an example of the safety scanner 10 in which one measurement unit 12 is connected to one display unit 11, a configuration in which a plurality of measurement units 12 can be connected to one display unit 11 may be, employed. In this case, the OSSD of the display unit 11 is turned on when all the target measurement units 12 confirm that the OSSD should be turned on in the respective protection areas, and turned off in the other cases.

<Display Unit 11>

Figure 4:
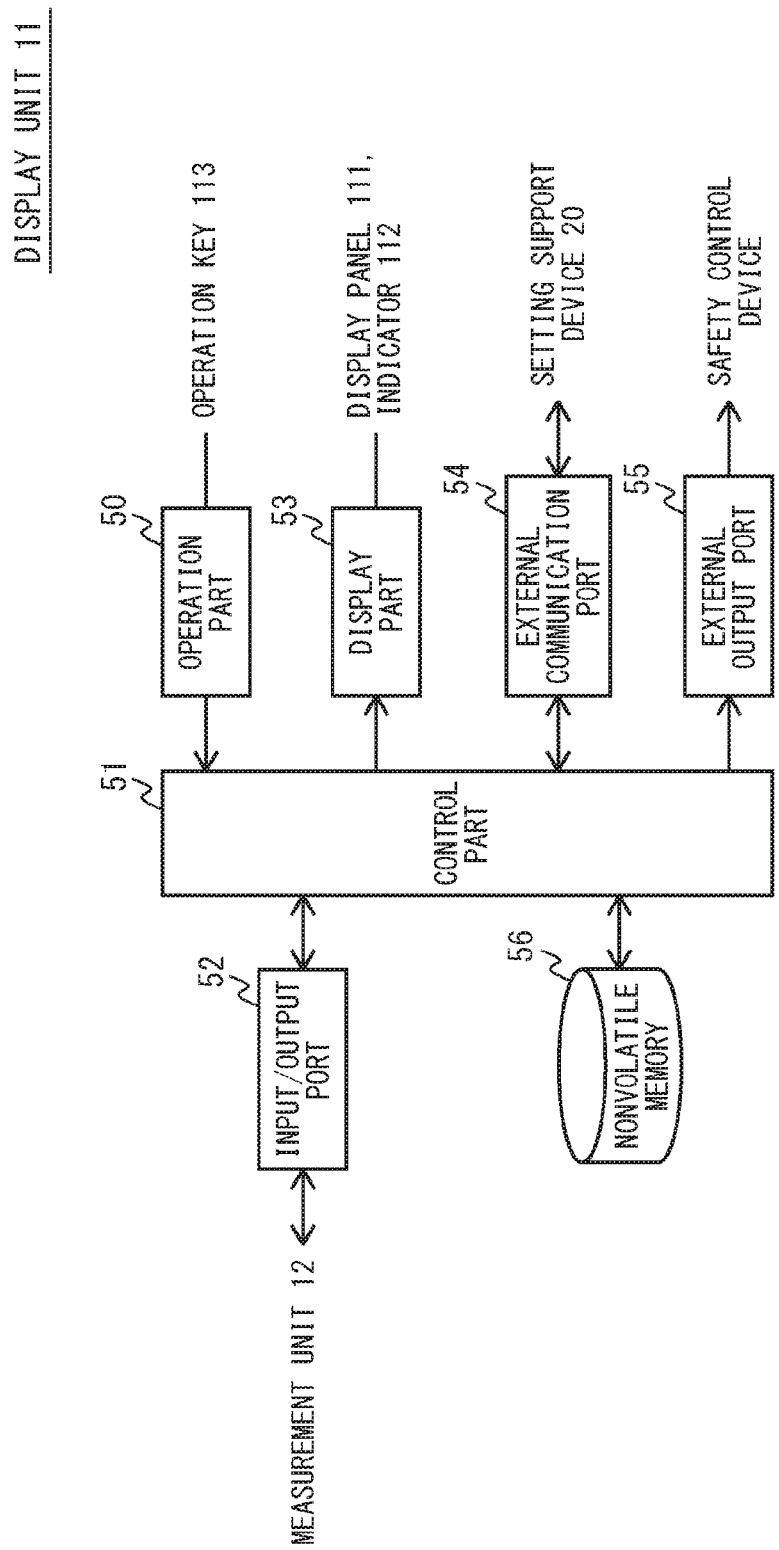
FIG. 4 is a block diagram illustrating an example of a functional configuration in a display unit of FIG. 2.

FIG. 4 is a block diagram illustrating an example of a functional configuration in the display unit 11 of FIG. 2. The display unit 11 includes an operation part 50, a control part 51, an input/output port 52, a display part 53, an external communication port 54, an external output port 55, and a nonvolatile memory 56.

The input/output port 52 is a communication interface part which communicates with the measurement unit 12, and transmits setting data including area designation information to the measurement unit 12 and receives an operating state, distance measurement information, a sensing signal, a scan image, a camera image, and area generation information from the measurement unit 12.

The external communication port 54 is a communication interface part which communicates with the setting support device 20, and receives setting data from the setting support device 20 and transmits an operating state, distance measurement information, a scan image, a camera image, and area generation information to the setting support device 20.

The external output port 55 is an interface part which outputs an output signal (an on state or an off state) of the OSSD to the safety control device as a sensing signal (safety control signal). Note that the external output port 55 may be configured to transmit an output signal (an on state or an off state) of the OSSD to the safety control device as a sensing signal (safety control signal) by two-way communication with the safety control device.

The operation part 50 generates an operation signal in accordance with a depression operation of the operation key 113 and outputs the operation signal to the control part 51. The display part 53 drives the display panel 111 and the indicator 112 to display setting data, an operating state, distance measurement information, a scan image, and a camera image on the display panel 111 and indicates an operating state on the indicator 112.

The control part 51 acquires distance measurement information, a scan image, a camera image, and area generation information from the measurement unit 12 through the input/output port 52 and transmits the acquired images and information items through the external communication port 54 to the setting support device 20. Further, the control part 51 acquires sensing information of an intruder from the measurement unit 12 and generates a sensing history on the basis of the sensing information. The sensing history includes, for example, a position of the sensed intruder (sensing position) and a time when the intruder is sensed (sensing time), and these sensing information items are associated with each other and stored as the sensing history.

The nonvolatile memory 56 is a nonvolatile storage element incorporated in the safety scanner 10. The nonvolatile memory 56 holds setting data acquired from the setting support device 20 and a sensing history created by the control part 51.

<Setting Support Device 20>

Figure 5:
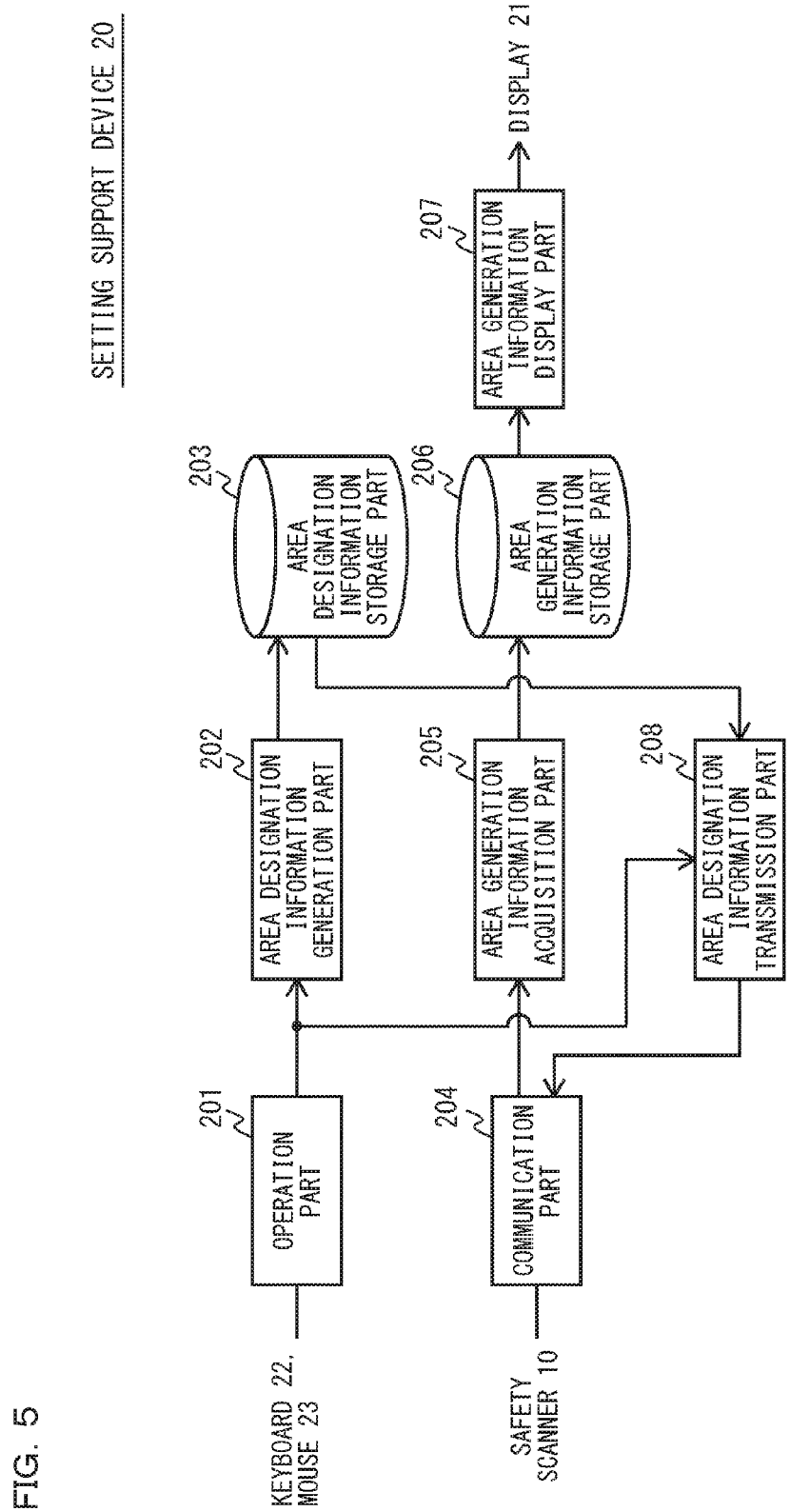
FIG. 5 is a block diagram illustrating an example of a functional configuration in a setting support device of FIG. 1.

FIG. 5 is a block diagram illustrating an example of a functional configuration in the setting support device 20 of FIG. 1. The setting support device 20 includes an operation part 201, an area designation information generation part 202, an area designation information storage part 203, a communication part 204, an area generation information acquisition part 205, an area generation information storage part 206, an area generation information display part 207, and an area designation information transmission part 208.

The operation part 201 generates an operation signal in accordance with an operation of the keyboard 22 and the mouse 23 and outputs the operation signal to the area designation information generation part 202 and the area designation information transmission part 208. The communication part 204 is an interface part which communicates with the display unit 11 of the safety scanner 10, and transmits setting data including area designation information to the safety scanner 10 and receives an operating state, distance measurement information, a scan image, a camera image, and area generation information from the safety scanner 10.

The area designation information generation part 202 generates area designation information in accordance with a user operation and stores the area designation information in the area designation information storage part 203. The area designation information is setting data for designating the protection area or the warning area within the detection area.

The area generation information acquisition part 205 acquires, through the communication part 204, area generation information including distance measurement information of the marker from the safety scanner 10 and stores the area generation information in the area generation information storage part 206.

The area generation information display part 207 drives the display 21 to display the scanning plane 3 of the detection light on a system screen and display a distance measurement position corresponding to distance measurement information of the marker on the scanning plane 3. The area generation information display part 207 displays, as a boundary of the protection area or the warning area, a polygonal line which chronologically connects two or more distance measurement positions which are sequentially acquired as distance measurement information of the marker on the scanning plane 3. For example, when two distance measurement positions are designated using the marker, a polygonal line which includes a line segment connecting the two distance measurement positions and a line segment connecting each of the distance measurement positions to a origin point (the position of the measurement unit 12) is drawn, and an area surrounded by the polygonal line is set as the protection area.

Further, the area generation information display part 207 displays a camera image on the system screen and displays a distance measurement position corresponding to distance measurement information of the marker on the camera image. A parameter which associates a position within the angle of view of the cameras 122 and 123 with the scanning angle of the detection light is held by the safety scanner 10. The setting support device 20 acquires the parameter from the safety scanner 10 and displays the protection area and the distance measurement position on the camera image.

The area designation information generation part 202 generates area designation information on the basis of distance measurement information of the marker. The area designation information transmission part 208 reads the area designation information from the area designation information storage part 203 in accordance with a transfer instruction of a user and transmits setting data including the area designation information to the safety scanner 10 through the communication part 204.

The setting data includes area designation information for designating the protection area or the warning area and measurement setting information for designating a measurement condition. For example, area designation information indicating the two-dimensional position, the shape, or the size of the protection area on the scanning plane 3 is created. Further, measurement setting information indicating a response speed, the size of an intruder to be a sensing target, a scanning period, or a resolving power is created.

<System Screen 24>

Figure 6:
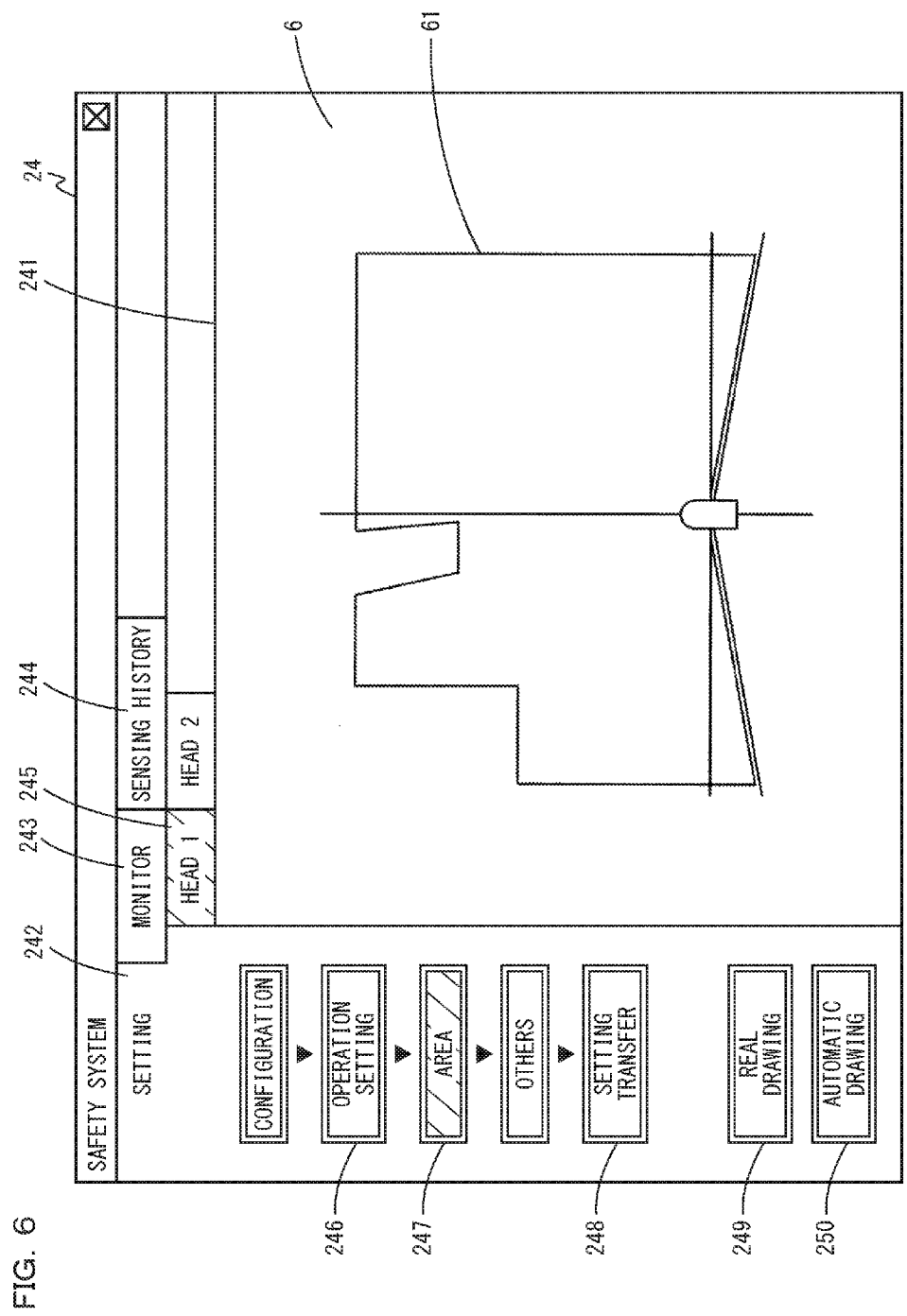
FIG. 6 is a diagram illustrating an example of the operation of the setting support device of FIG. 5 and illustrates a system screen displayed on a display.

FIG. 6 is a diagram illustrating an example of the operation of the setting support device 20 of FIG. 5 and illustrates a system screen 24 displayed on the display 21. The system screen 24 is a screen for setting the operation of the safety scanner 10 and checking an operating state and distance measurement information of the safety scanner 10, and displayed on the display 21.

The system screen 24 is provided with an image display region 241, and a setting tab 242, a monitor tab 243, a sensing history tab, 244 and a display target selection tab 245 are displayed thereon. The current scan image 6 is displayed in the image display region 241.

The scan image 6 is a distance measurement line image formed by displaying a distance measurement line 61 which connects a plurality of distance measurement positions obtained within the scanning period of the detection light on the scanning plane 3 and updated at a constant frame rate corresponding to the scanning period of the detection light. The current state around the measurement unit 12 can be grasped by watching the scan image 6.

In this example, the scan image 6 is drawn with the upper direction of the system screen 24 aligned with the front direction of the measurement unit 12. The distance measurement line 61 is a figure representing the boundary of the detection area and includes a polygonal line formed by plotting a distance measurement position corresponding to the detection distance for each constant scanning angle. Orthogonal coordinates which include the measurement unit 12 as an origin point, a y axis aligned with the front-rear direction, and an x axis aligned with the right-left direction are indicated on the scan image 6. Note that two or more grid lines which are parallel to the coordinate axes may be displayed on the scan image 6.

The setting tab 242 is an operation icon for displaying an edit screen for setting data creation as the system screen 24. The monitor tab 243 is an operation icon for displaying the current scan image or camera image in the image display region 241. The sensing history tab 244 is an operation icon for displaying a sensing history.

In this example, the setting tab 242 is selected, and menu items 246 to 248 for setting the operation of the safety scanner 10, a real drawing button 249, and an automatic drawing button 250 are displayed on the left side with respect to the image display region 241.

The display target selection tab 245 is an operation icon for selecting the measurement unit 12 to be displayed. When a plurality of measurement units 12 are coupled to the display unit 11 which is connected to the setting support device 20, any of the measurement units 12 can be selected as a display target, and the corresponding camera image or scan image can be displayed in the image display region 241 by operating the display target selection tab 245. In this example, a measurement unit "HEAD 1" is selected as a display target, and the corresponding scan image 6 is displayed.

The menu item 246 is an operation icon for designating the measurement condition of the safety scanner 10. The menu item 247 is an operation icon for designating the protection area or the warning area. The menu item 248 is an operation icon for transmitting setting data to the safety scanner 10. In this example, the menu item 247 is selected.

The real drawing button 249 is an operation icon for selecting an area marker designation function of designating the protection area or the warning area by moving the marker along the outer edge of the area.

The automatic drawing button 250 is an operation icon for selecting an automatic area designation function of automatically designating the protection area or the warning area using the current distance measurement information. When the automatic area designation function is selected by operating the automatic drawing button 250, an area which includes a polygonal line extending along the distance measurement line 61 as a part of the boundary thereof is automatically designated as the protection area or the warning area closer to the measurement unit 12 than the distance measurement line 61.

Figure 7:
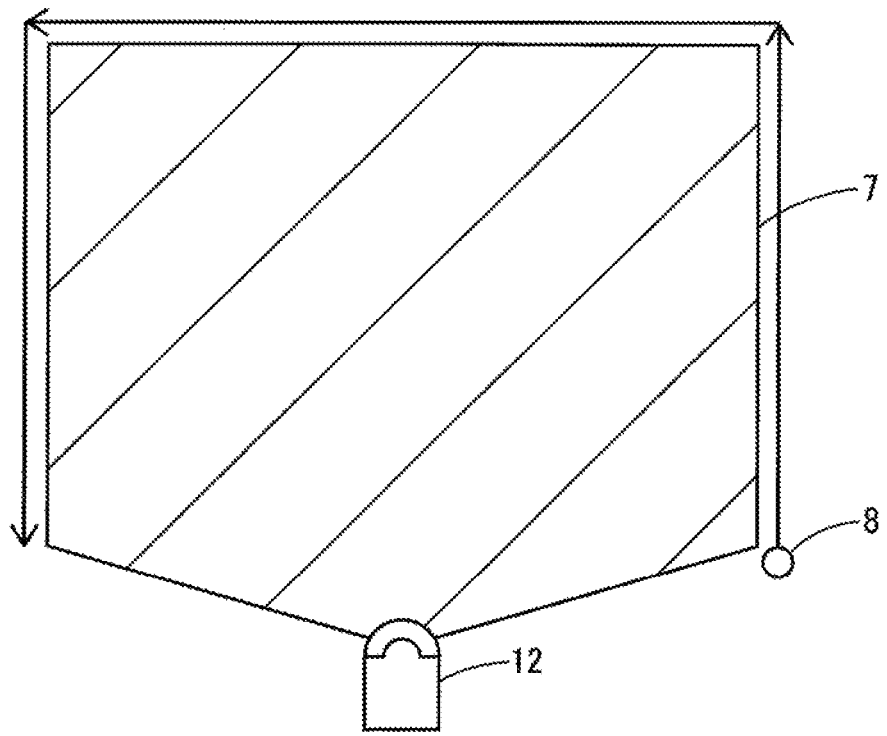
FIG. 7 is a diagram illustrating an example of an operation of performing area setting by moving a marker along a boundary of a polygonal area which includes the measurement unit as one of the vertexes thereof.

FIG. 7 is a diagram illustrating an example of an operation of performing area setting by moving a marker 8 along the boundary of a polygonal area 7 which includes the measurement unit 12 as one of the vertexes thereof. The polygonal area 7 is a pentagonal area including two sides which extend in the front-rear direction of the measurement unit 12, one side which faces the front face of the measurement unit 12 and extends in the right-left direction, and two oblique sides each of which connects an endpoint of the side extending in the front-rear direction to the measurement unit 12.

The marker 8 is an object having high light reflectance, for example, an object provided with a retroreflector and moves in a real space along the boundary of the polygonal area 7. The retroreflector is an optical member which reflects light incident from any direction in the same direction as the incident direction. In this example, the marker 8 is moved from one of the vertexes that is located on the right side in the front direction of the measurement unit 12 and connects the oblique side to the side extending in the font-rear direction as a starting point so as to pass through the four vertexes of the polygonal area 7 including the starting point sequentially in a counter clockwise direction. The polygonal area 7 can be designated as the protection area or the warning area by moving the marker 8 along the outer edge of the polygonal area 7 in this manner.

Figure 8:
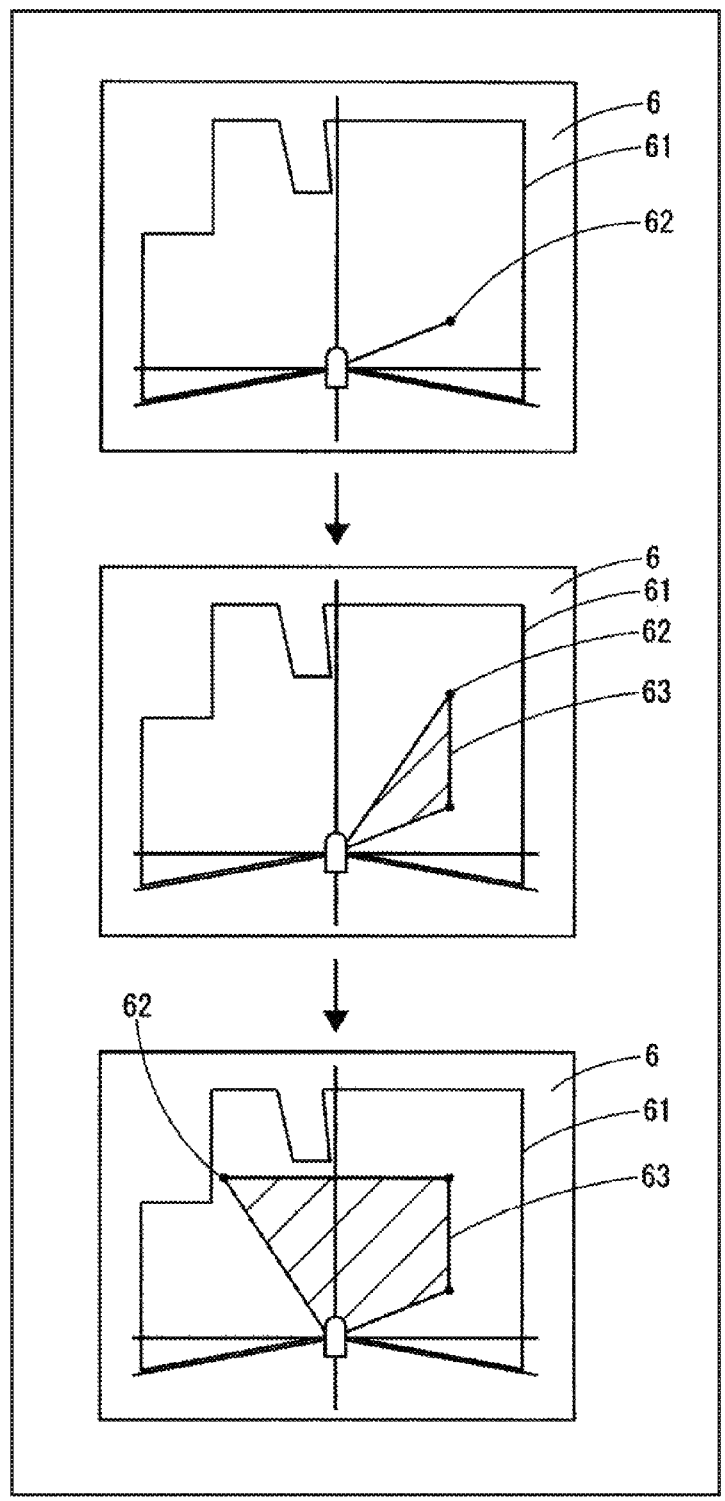
FIG. 8 is a diagram illustrating an example of the operation of the setting support device of FIG. 5 and illustrates a case in which distance measurement information items indicating the positions of the vertexes of the polygonal area are sequentially captured as area generation information.
Figure 9:
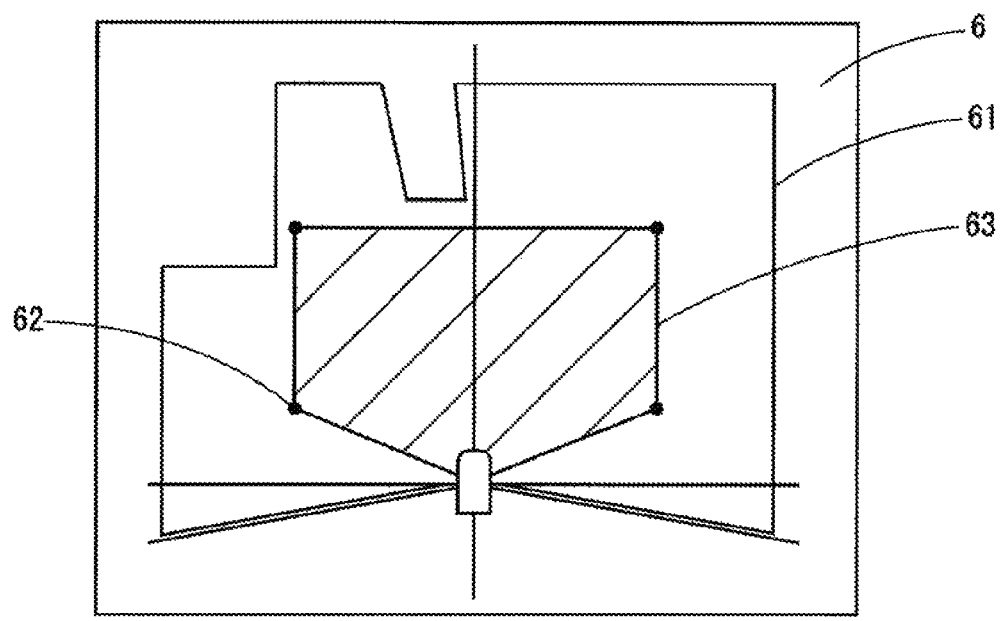
FIG. 9 is a diagram illustrating an example of the operation of the setting support device of FIG. 5 in which a polygonal line which chronologically connects four sequentially acquired distance measurement positions is displayed on a scan image.

FIGS. 8 and 9 are diagrams illustrating an example of the operation of the setting support device 20 of FIG. 5. FIGS. 8 and 9 illustrate a scan image displayed in the image display region 241 of the system screen 24. FIG. 8 illustrates a case in which distance measurement information items indicating the positions of the vertexes of the polygonal area 7 are sequentially captured as area generation information. In FIG. 9, a polygonal line 63 which chronologically connects four sequentially acquired distance measurement positions 62 is displayed on the scan image 6.

A movable body is identified as the marker 8 by stopping the movable body for a certain time or longer at a desired position, and the corresponding distance measurement position 62 is captured as a sensing position for area designation. Alternatively, a movable body is identified as the marker 8 by transmitting a capture signal by operating the operation key 113 of the display unit 11, and the corresponding distance measurement position 62 is captured as a sensing position for area designation.

The distance measurement position 62 is displayed on the scan image 6 in a display mode different from the distance measurement line 61. For example, the distance measurement line 61 which represents the background is indicated by a black solid line, and, on the other hand, the distance measurement position 62 is indicated by a green dot.

When the distance measurement positions 62 are sequentially captured as sensing positions, the polygonal line 63 which chronologically connects the distance measurement positions 62 is displayed. When the positions of the four vertexes of the polygonal area 7 are captured as the distance measurement positions 62 in this manner, the protection area or the warning area is determined, and area designation information is created.

Figure 10:
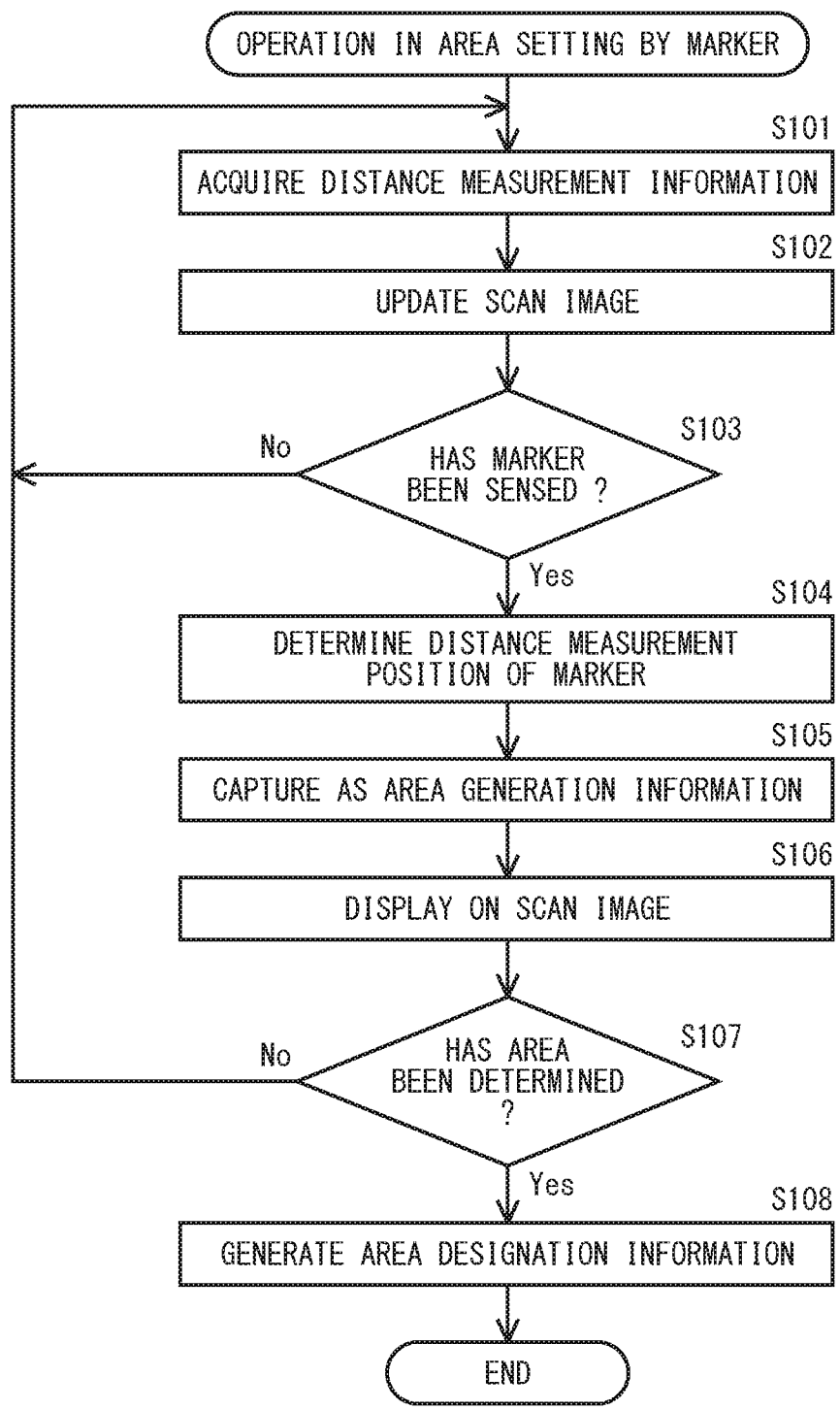
FIG. 10 is a flow chart illustrating an example of the operation of the setting support device of FIG. 5 and illustrates a processing procedure in area setting by the marker.

FIG. 10 including steps S101 to S108 is a flow chart illustrating an example of the operation of the setting support device 20 of FIG. 5 and illustrates a processing procedure in area setting by the marker 8. FIG. 10 illustrates a processing procedure performed when the real drawing button 249 in the system screen 24 is operated to select the area marker designation function.

First, the setting support device 20 acquires the current distance measurement information from the safety scanner 10, and updates the scan image 6 in the system screen 24 (steps S101, S102). Then, when the marker 8 has been sensed (S103), the setting support device 20 determines a distance measurement position of the marker 8 as a sensing position, captures positional information indicating the sensing position as area generation information, and displays the sensing position on the scan image 6 (steps S104 to S106).

Then, when a user operation for determining an area has been performed (step S107), the setting support device 20 determines the protection area or the warning area by an area including, as the boundary thereof, the polygonal line 63 which connects the plurality of distance measurement positions 62 and generates area designation information (step S108).

According to the present embodiment, the marker 8 within the detection area is identified, and the distance measurement information thereof is transmitted to the setting support device 20. Thus, the distance measurement position of the marker 8 can be displayed on the system screen 24 in the setting support device 20. In particular, since the marker 8 within the detection area is identified, and the distance measurement position thereof is displayed on the scanning plane 3, the correspondence relationship between the distance measurement position on the scanning plane 3 and the real space can be easily grasped from the position of the marker 8 in the detection area.

Further, the area designation information is automatically generated using the distance measurement information of the marker 8. Thus, an operation of creating setting data can be simplified. In particular, the distance measurement information of the marker 8 can be automatically transmitted to the setting support device 20 merely by temporarily stopping the marker 8. Further, a monitoring target area such as the protection area is set by identifying the marker 8. Thus, an output of the OSSD is switched to an off state by inserting an object other than the marker 8, for example, a hand into the area during area setting, and it is possible to easily identify whether or not the monitoring target area is correctly designated at a desired position in the real space.

Although, in the present embodiment, there is described an example of the area marker designation function of automatically designating the monitoring target area by moving the marker 8 along the outer edge of the area, the present invention is also applicable to a configuration capable of selecting the area marker designation function during a simulation mode.

The simulation mode is an operation mode which determines the presence or absence of an intruder into the monitoring target area on the basis of area designation information before being transmitted to the safety scanner 10 and distance measurement information received from the safety scanner 10, and displays the determination result on, for example the system screen 24. Selecting such an operation mode enables the setting support device 20 to check whether or not sensing of an intruder is appropriately performed with the monitoring target area which is designated using the setting support device 20 without transmitting the area designation information to the safety scanner 10 and enables an editing operation for area designation information to be simplified.

For example, the setting support device 20 further includes an edit screen display part which displays an edit screen, a position designation part which designates a position on the scanning plane 3 in accordance with a user operation, and a pseudo determination information generation part which determines the presence or absence of an intruder into the monitoring target area on the basis of area designation information before being transmitted to the safety scanner 10 and distance measurement information received from the safety scanner 10 and generates pseudo determination information which indicates the determination result. The edit screen display part drives the display 21 to display the edit screen for creating area designation information on the display 21. A scan image and a determination result corresponding to pseudo determination information are displayed on the edit screen.

The area designation information generation part 202 generates area designation information on the basis of a position designated by the position designation part. A scan image which is formed of a distance measurement line which chronologically connects a plurality of distance measurement positions obtained within the scanning period of the detection light is displayed on the edit screen. A user designates a position on the scan image. For example, a plurality of positions are sequentially designated along the boundary of a desired area, so that an area including, as a part of the boundary thereof, a polygonal line which chronologically connects these positions is designated as a monitoring target area. The determination of an intruder is performed by identifying a two-dimensional position of the intruder from distance measurement information, and comparing and checking the identified two-dimensional position against positional information of the monitoring target area.

When an operation mode is the simulation mode, the output of the OSSD of the safety scanner 10 is forcibly controlled to an off state, or controlled to an on state or an off state on the basis of the currently set protection area. The indicator 124 is lit according to a state of the OSSD output. For example, the indicator 124 is lit in green when the OSSD output is in an on state and lit in red when the OSS output is in an off state. Note that green flashing and red flashing are switched according to pseudo determination information during the simulation mode.

When the safety scanner 10 senses the marker 8, the safety scanner 10 indicates that the marker 8 has been sensed using the indicator 124. For example, during the simulation mode, the indicator 124 flashes in green or red according to the pseudo determination information. Then, when the area marker designation function is selected, and the safety scanner 10 senses the marker 8, the indicator 124 is lit in orange for a certain time. The setting support device 20 acquires distance measurement information of the marker 8 from the safety scanner 10 and updates the pseudo determination information on the basis of the acquired distance measurement information. The indicator 124 is lit in orange for a certain time after the sensing of the marker 8, and then flashes in green or red according to the updated pseudo determination information. Note that the determination indication according to the pseudo determination information and the indication indicating that the marker 8 has been sensed may be performed by the setting support device 20 instead of the indicator 124. Alternatively, the determination indication according to the pseudo determination information and the indication indicating that the marker 8 has been sensed may be performed by the setting support device 20 in addition to the indicator 124.

Although, in the present embodiment, there is described an example in which the marker 8 is identified on the basis of the receiving amount of reflected light, a method for identifying the marker 8 of the present invention is not limited thereto. For example, the marker 8 may be identified on the basis of the shape of a reflecting surface which reflects the detection light. Specifically, a movable body that includes a reflecting surface whose cross section taken along the scanning plane 3 has a linear shape or a circular arc shape is identified as the marker 8. Alternatively, a movable body whose size, for example, width in the scanning direction of the detection light is within a predetermined range is identified as the marker 8. According to such a configuration, an object whose reflecting surface reflecting the detection light has a predetermined shape or an object having a size within a predetermined range can be used as the marker 8.

Further, the marker 8 may be identified on the basis of a polarization component of reflected light. Specifically, polarization components of reflected light, for example, an S polarization component and a P polarization component are identified, and the marker 8 is identified on the basis of a comparison result obtained by comparing a ratio of the polarization components with a determination threshold. Alternatively, a receiving amount of reflected light for a certain polarization component is identified and compared with a determination threshold to identify the marker 8.

Although, in the present embodiment, there is described an example in which an object having high light reflectance is used as the marker 8, the marker 8 of the present invention is not limited thereto. For example, when the safety scanner 10 is capable of identifying a light emitting object, the light emitting object may be used as the marker 8.

Further, an optically readable code, for example, a two-dimensional code may be identified by extracting a characteristic point by analyzing a camera image, and an object having a predetermined two-dimensional code may be identified as a marker.

Although, in the present embodiment, there is described an example in which the monitoring target area such as the protection area is determined by sequentially indicating the positions of the vertexes of the polygonal area 7 by the marker 8, the area designation method by the marker 8 of the present invention is not limited thereto. For example, an area having a predetermined shape such as a circular shape may be designated as the monitoring target area by indicating a center point or a reference point by the marker 8 instead of indicating the vertexes of the monitoring target area. Further, an area that is not a monitoring target of intruder sensing, for example, a muting area may be indicated by the marker 8, so that the detection area other than the indicated area may be designated as the monitoring target area.

Although, in the present embodiment, there is described an example in which a monitoring target area including, as a part of the boundary thereof, a polygonal line which chronologically connects two or more positions which are sequentially acquired as distance measurement information of the marker 8 is designated, the area designation method by the marker 8 of the present invention is not limited thereto. For example, a monitoring target area including a locus of the marker 8 as a part of the boundary thereof may be designated by successively capturing distance measurement positions of the marker 8 which are updated at each scanning period of the detection light instead of designating the positions of discrete points.

What is claimed is:

1. A safety scanner comprising:
    a light emitter configured to emit a detection light to a detection area;
    a light receiver configured to receive the detection light reflected from an object within the detection area and configured to generate a light receiving signal in accordance with the detection light;
    a distance calculation section configured to determine a distance to the object on the basis of the light receiving signal;
    a scanner configured to direct the detection light to the detection area to scan the detection area in a circumferential direction around a rotation axis;
    a distance measurement section configured to obtain a distance measurement information corresponding to the distance determined by the distance calculation section and a scanning angle of the detection light directed by the scanner;
    an area designation information receiving section configured to receive an area designation information designating a protection area within the detection area from a setting support device;
    an intrusion sensing section configured to determine the object within the protection area on the basis of the distance measurement information and the area designation information;
    a marker identification section configured to identify a marker movably disposed within the detection area on the basis of a predetermined identification threshold; and
    an area generation information transmission section configured to transmit the distance measurement information with respect to the marker obtained by the distance measurement section in response to identifying the marker by the marker identification section to the setting support device as an area generation information for determining the protection area.

2. The safety scanner according to claim 1, wherein the marker identification section identifies the marker on the basis of a receiving amount of the reflected light received by the receiver.

3. The safety scanner according to claim 1, wherein the marker identification section identifies the marker on the basis of a shape of a reflecting surface that reflects the detection light.

4. The safety scanner according to claim 1, wherein the marker identification section identifies the marker on the basis of a polarization component of the reflected light.

5. The safety scanner according to claim 1, wherein
    the marker identification section identifies a movable body as the marker on the basis of a stop time of the movable body that is temporarily stopped, and
    the area generation information transmission section transmits the distance measurement information with respect to the marker obtained by the distance measurement section in response to identifying the marker in a temporarily stopped state by the marker identification section.

6. A safety scanner comprising:
    a light emitter configured to emit a detection light to a detection area;
    a light receiver configured to receive the detection light reflected from an object within the detection area and configured to generate a light receiving signal in accordance with the detection light;
    a distance calculation section configured to determine a distance to the object on the basis of the light receiving signal;
    a scanner configured to direct the detection light to the detection area to scan the detection area in a circumferential direction around a rotation axis;
    a distance measurement section configured to obtain a distance measurement information corresponding to the distance determined by the distance calculation section and a scanning angle of the detection light directed by the scanner;
    an area designation information receiving section configured to receive an area designation information designating a protection area within the detection area from a setting support device;
    an intrusion sensing section configured to determine the object within the protection area on the basis of the distance measurement information and the area designation information;
    a capture signal receiving section configured to receive a capture signal;
    a marker identification section configured to identify a marker movably disposed within the detection area on the basis of a predetermined identification threshold; and
    an area generation information transmission section configured to transmit the distance measurement information with respect to the marker obtained by the distance measurement section in accordance with the capture signal to the setting support device as an area generation information for determining the protection area.

7. An optical safety system comprising:
    a light emitter configured to emit a detection light to a detection area;
    a light receiver configured to receive the detection light reflected from an object within the detection area and configured to generate a light receiving signal in accordance with the detection light;
    a distance calculation section configured to determine a distance to the object on the basis of the light receiving signal;
    a scanner configured to direct the detection light to the detection area to scan the detection area in a circumferential direction around a rotation axis;
    a distance measurement section configured to obtain a distance measurement information corresponding to the distance determined by the distance calculation section and a scanning angle of the detection light directed by the scanner;
    an area designation information generation section configured to generate an area designation information designating a protection area within the detection area;
    an intrusion sensing section configured to determine the object within the protection area on the basis of the distance measurement information and the area designation information;
    a marker identification section configured to identify a marker movably disposed within the detection area on the basis of a predetermined identification threshold; and
    an area generation information display section configured to display a scanning plane of the detection light on a screen and configured to display a distance measurement position corresponding to the distance measurement information with respect to the marker, identified by the marker identification section, obtained by the distance measurement section on the scanning plane, wherein the area designation information generation section configured to generate the area designation information on the basis of the distance measurement information with respect to the marker identified by the marker identification section.

8. The optical safety system according to claim 7, wherein the area generation information display section displays, as a boundary of the protection area, a polygonal line that chronologically connects two or more distance measurement positions that are sequentially acquired as the distance measurement information with respect to the marker on the scanning plane.

9. The optical safety system according to claim 7, wherein
the area designation information generation section generates the area designation information that also designates a warning area within the detection area on the basis of the distance measurement information with respect to the marker identified by the marker identification section, and the intrusion sensing section outputs a safety control signal for emergently stopping a machine in response to determining the object within the protection area and outputs a warning notification in response to determining the object within the warning area.

10. The optical safety system according to claim 7, further comprising an imaging section configured to capture an image of the detection area to generate a camera image, wherein the area generation information display section displays the camera image on the screen and displays a distance measurement position corresponding to the distance measurement information with respect to the marker on the camera image.

* * * * *